United States Patent
Iwamoto et al.

(10) Patent No.: US 11,387,631 B2
(45) Date of Patent: Jul. 12, 2022

(54) CIRCUIT BREAKER

(71) Applicant: Mitsubishi Electric Corporation, Chiyoda-ku (JP)

(72) Inventors: Naoki Iwamoto, Chiyoda-ku (JP); Hirokazu Otani, Chiyoda-ku (JP); Motohiro Sato, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 480 days.

(21) Appl. No.: 16/479,664

(22) PCT Filed: Oct. 24, 2017

(86) PCT No.: PCT/JP2017/038250
§ 371 (c)(1),
(2) Date: Jul. 22, 2019

(87) PCT Pub. No.: WO2018/150634
PCT Pub. Date: Aug. 23, 2018

(65) Prior Publication Data
US 2020/0263934 A1    Aug. 20, 2020

(30) Foreign Application Priority Data

Feb. 20, 2017    (JP) .............................. JP2017-028762

(51) Int. Cl.
*H01H 9/52*    (2006.01)
*H01H 33/00*    (2006.01)
(Continued)

(52) U.S. Cl.
CPC ................. *H02B 1/56* (2013.01); *H01H 9/52* (2013.01); *H02G 5/10* (2013.01); *H01H 33/002* (2013.01);
(Continued)

(58) Field of Classification Search
CPC .............. H01H 9/52; H01H 2009/523; H01H 2009/526; H01H 33/002;
(Continued)

(56) References Cited

U.S. PATENT DOCUMENTS 4,358,631 A * 11/1982 Matsuda ................ H01B 17/26
174/15.2
7,038,912 B2 * 5/2006 Pleines ................... F28F 3/048
218/155

(Continued)

FOREIGN PATENT DOCUMENTS

| JP | 62-268315 A | 11/1987 |
|---|---|---|
| JP | 2006-149191 A | 6/2006 |
| JP | 2010-51169 A | 3/2010 |

OTHER PUBLICATIONS

International Search Report dated Jan. 30, 2018 in PCT/JP2017/038250 filed Oct. 24, 2017.

*Primary Examiner* — William A Bolton
(74) *Attorney, Agent, or Firm* — Xsensus LLP

(57) ABSTRACT

A heat pipe includes an insulating hollow body located inside an outer conductor. The insulating hollow body insulates a portion of the heat pipe on an outer conductor side and a portion of the heat pipe on an inner conductor side from each other. The heat pipe has a plurality of sections each connecting a corresponding one of a plurality of connection conductors to the insulating hollow body. The heat pipe further includes a communication path connecting portions of the heat pipe to each other to cause the plurality of sections to be in communication with each other. Each of the portions is connected to a corresponding one of the plurality of connection conductors.

16 Claims, 9 Drawing Sheets

(51) Int. Cl.
*H02B 1/56* (2006.01)
*H02G 5/10* (2006.01)
(52) U.S. Cl.
CPC . *H01H 2009/523* (2013.01); *H01H 2009/526* (2013.01)
(58) Field of Classification Search
CPC .............. H01H 2033/6613; H02B 1/56; H02B 13/035; H01B 17/26; H02G 5/10; F28F 2270/00; F28D 15/0233; F28D 15/0275
USPC .......................................... 200/289; 219/494
See application file for complete search history.

(56) References Cited

U.S. PATENT DOCUMENTS

| | | | | |
|---|---|---|---|---|
| 7,881,033 | B2* | 2/2011 | Chartouni | F28D 15/0275 361/115 |
| 8,426,730 | B2* | 4/2013 | Widmer | H01H 33/42 174/15.5 |
| 8,711,550 | B2* | 4/2014 | Frigiere | F28D 15/0266 361/677 |
| 8,717,746 | B2* | 5/2014 | Kaufmann | H02G 5/10 361/624 |
| 8,718,418 | B2* | 5/2014 | Haefner | H02B 13/0356 385/12 |
| 9,599,408 | B1* | 3/2017 | Hartenstine | F28D 15/0233 |
| 2006/0102618 | A1 | 5/2006 | Lakner et al. | |
| 2009/0255794 | A1* | 10/2009 | Kurth | H01H 33/6606 200/289 |

\* cited by examiner

CIRCUIT BREAKER

CROSS-REFERENCE TO RELATED APPLICATIONS

This application is a United States national stage application of International Application No. PCT/JP2017/038250, filed Oct. 24, 2017, which designates the United States, and claims priority to Japanese Patent Application No. 2017-028762, filed Feb. 20, 2017, and the entire contents of each of the above applications are hereby incorporated herein by reference in entirety.

TECHNICAL FIELD

The present invention relates to circuit breakers.

BACKGROUND ART

Japanese Patent Laying-Open No. 2006-149191 (PTL 1) is a prior art literature disclosing a configuration of a circuit breaker. The circuit breaker described in PTL 1 includes an inner conductor, an outer conductor, and a plurality of heat pipes. Each of the plurality of heat pipes has an insulating hollow body. The plurality of heat pipes include a heat pipe branched to be connected to two portions of the inner conductor.

CITATION LIST

Patent Literature

PTL 1: Japanese Patent Laying-Open No. 2006-149191

SUMMARY OF INVENTION

Technical Problem

In some cases, the temperature of the heat generated in the inner conductor varies partially. Thus, when the heat pipe is branched to be connected to two portions of the inner conductor, a temperature difference may be caused between the two portions of the inner conductor.

If refrigerant liquefied inside the heat pipe flows disproportionately through the branch portions of the heat pipe, a greater amount of refrigerant is distributed to a portion connected with the inner conductor located on the lower temperature side, and a smaller amount of refrigerant is distributed to a portion connected with the inner conductor on the higher temperature side, a temperature difference may increase further in the inner conductor. Consequently, the inner conductor cannot be cooled stably.

The present invention has been made in view of the above problem, and has an object to provide a circuit breaker that can stably cool an inner conductor.

Solution to Problem

A circuit breaker according to the present invention includes an inner conductor, an outer conductor, a plurality of flexible conductors, a plurality of connection conductors, a heat pipe, and a radiator. The inner conductor has a direction of extension. The outer conductor surrounds an outer circumference of the inner conductor with a spacing between the inner conductor and the outer conductor. Each of the plurality of flexible conductors has a first end connected to the outer circumference of the inner conductor and has flexibility. The first ends of the plurality of flexible conductors are spaced from each other in the direction of extension. Each of the plurality of connection conductors is provided inside the outer conductor. The plurality of connection conductors are connected to second ends of the plurality of flexible conductors in one-to-one correspondence. The heat pipe is connected to each of the plurality of connection conductors. The heat pipe is drawn to outside of the outer conductor and contains refrigerant. The radiator is provided on an outer circumference of a portion of the heat pipe which is drawn to outside of the outer conductor. The heat pipe includes an insulating hollow body located inside the outer conductor. A portion of the heat pipe on an outer conductor side and a portion of the heat pipe on an inner conductor side are insulated from each other by the insulating hollow body. The heat pipe has a plurality of sections each connecting a corresponding one of the plurality of connection conductors to the insulating hollow body. The heat pipe further includes a communication path connecting portions of the heat pipe to cause the plurality of sections to be in communication with each other. Each of the portions is connected to a corresponding one of the plurality of connection conductors to each other.

Advantageous Effects of Invention

The present invention can stably cool the inner conductor of the circuit breaker.

DESCRIPTION OF EMBODIMENTS

Circuit breakers according to embodiments of the present invention will be described below with reference to the drawings. In the following embodiments, the same or corresponding parts are designated by the same references, and description thereof will not be repeated.

Embodiment 1

Figure 1:
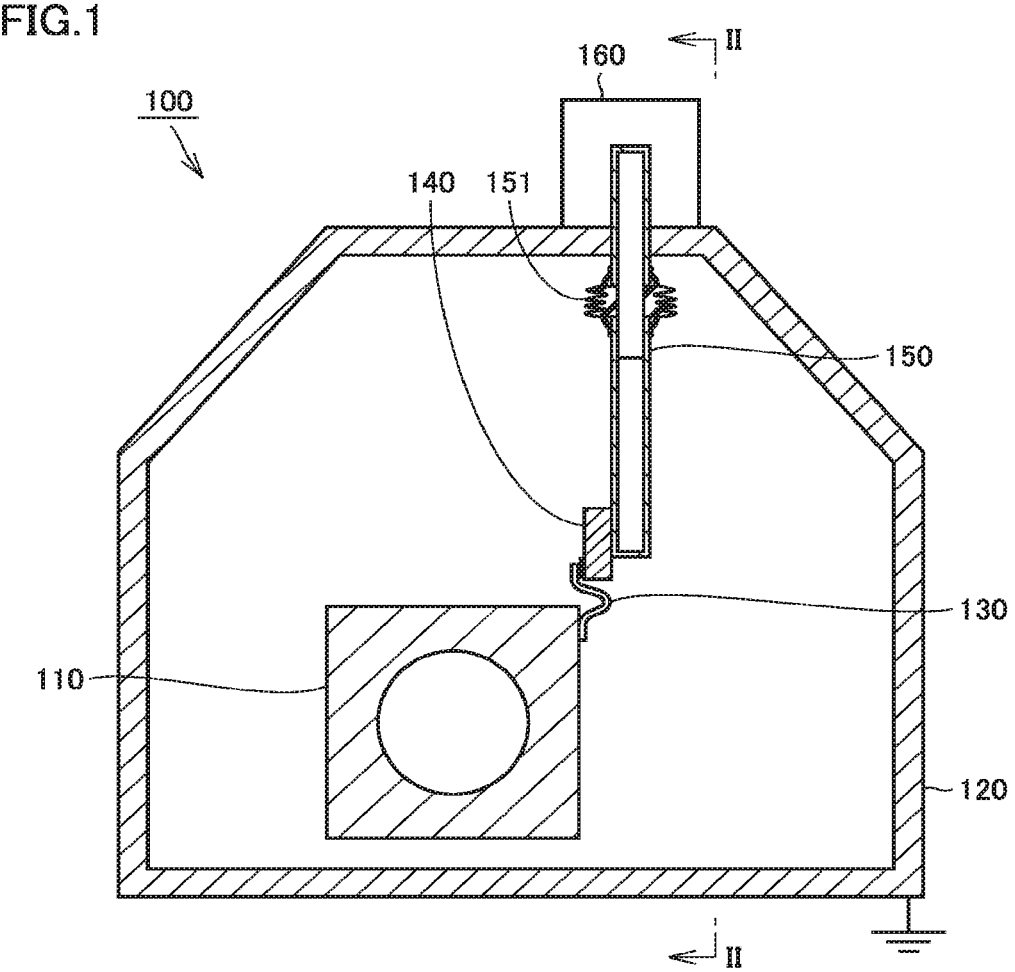
FIG. 1 is a lateral sectional view showing a configuration of a circuit breaker according to Embodiment 1 of the present invention.
Figure 2:
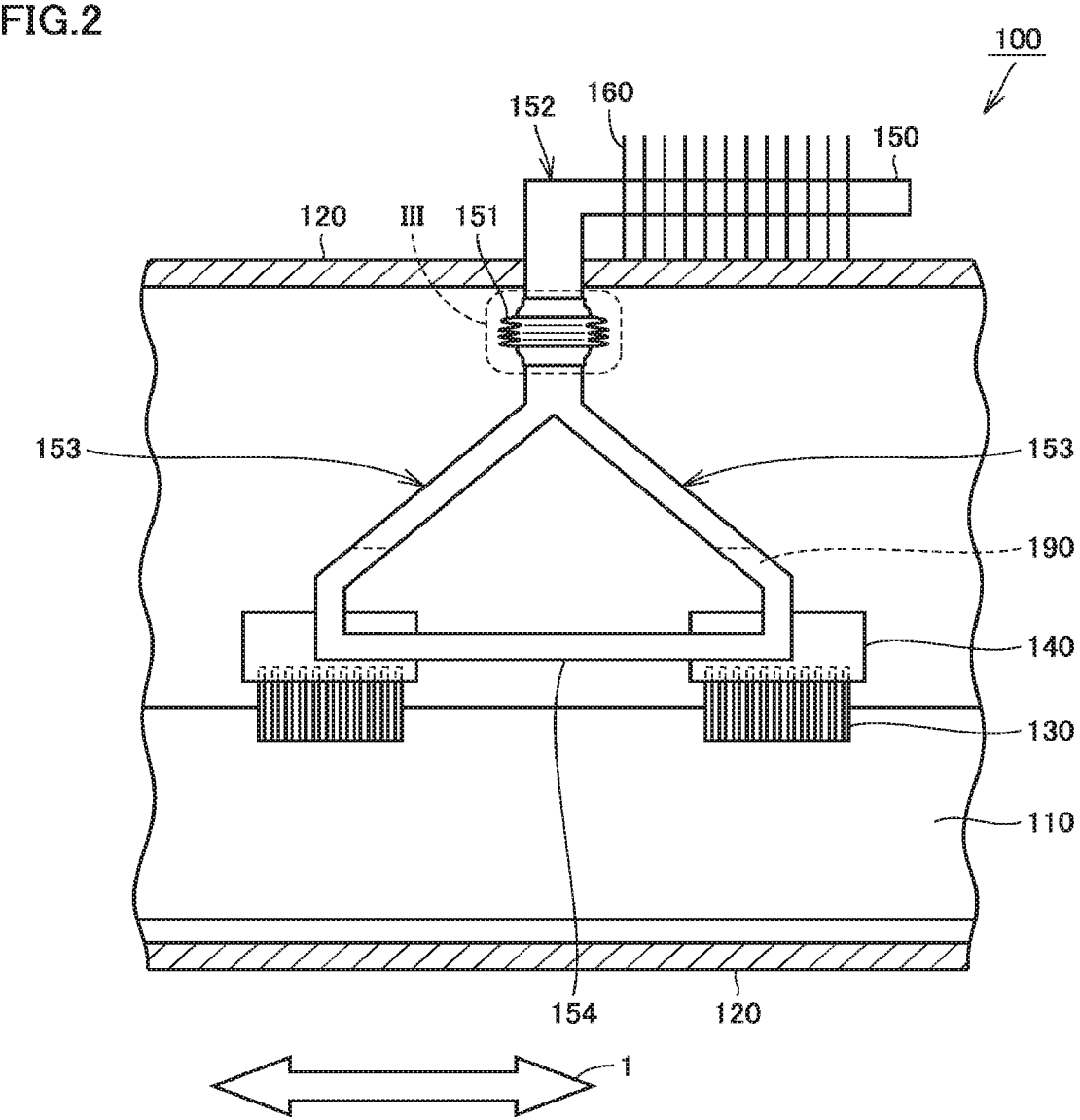
FIG. 2 is a sectional view of the circuit breaker of FIG. 1, which is seen from a direction of an arrow II-II.
Figure 3:
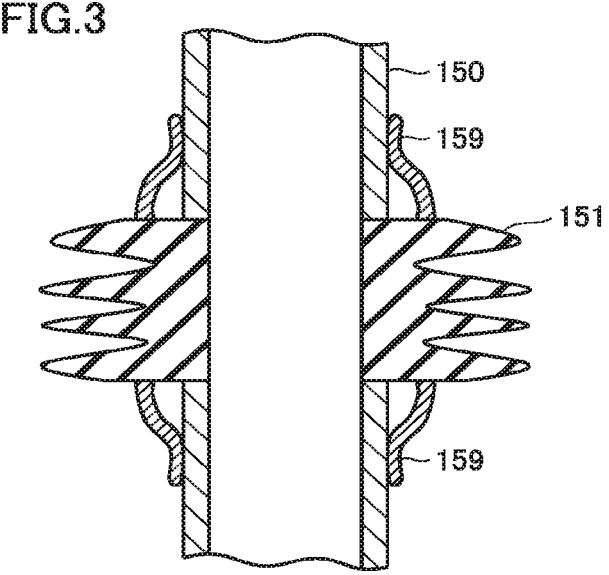
FIG. 3 is a sectional view showing a portion III of FIG. 2 in an enlarged manner.
Figure 4:
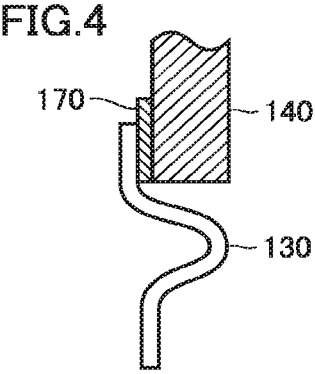
FIG. 4 is a lateral sectional view showing a portion at which a flexible conductor and a connection conductor are connected to each other in the circuit breaker according to Embodiment 1 of the present invention in an enlarged manner.

FIG. 1 is a lateral sectional view showing a configuration of a circuit breaker according to Embodiment 1 of the present invention. FIG. 2 is a sectional view of the circuit breaker of FIG. 1, which is seen from the direction of an arrow II-II. FIG. 3 is a sectional view showing a portion III of FIG. 2 in an enlarged manner. FIG. 4 is a lateral sectional view showing a portion at which a flexible conductor and a connection conductor are connected to each other in the circuit breaker according to Embodiment 1 of the present invention in an enlarged manner.

A circuit breaker 100 according to Embodiment 1 of the present invention is a circuit breaker that interrupts an electric circuit of, for example, a power plant in which a large current flows upon application of a high voltage of about 20 kV.

As shown in FIGS. 1 to 4, circuit breaker 100 according to Embodiment 1 of the present invention includes an inner conductor 110, an outer conductor 120, a plurality of flexible conductors 130, a plurality of connection conductors 140, a heat pipe 150, and a radiator 160.

Inner conductor 110 has a direction of extension 1. In the present embodiment, inner conductor 110 has a shape of a square column with a diameter of about 500 mm and a length of about 2 m. The inner circumferential surface of inner conductor 110 has a cylindrical shape. Inner conductor 110 generates heat due to an electric resistance during energization. Inner conductor 110 includes an interrupting portion (not shown) for interrupting a circuit. The position of inner conductor 110 is mechanically displaced during the interruption of the circuit.

Outer conductor 120 surrounds the outer circumference of inner conductor 110 with a spacing between inner conductor 110 and outer conductor 120. Outer conductor 120 is grounded. Return current flows through outer conductor 120. During energization, a large potential difference is caused between inner conductor 110 and outer conductor 120.

Each of flexible conductors 130 has a first end connected to the outer circumference of inner conductor 110. The first ends of flexible conductors 130 are spaced from each other in direction of extension 1 of inner conductor 110. Each of flexible conductors 130 has high flexibility and high thermal conductivity. In the present embodiment, each of flexible conductors 130 is formed of thin copper wires which are bundled while bending.

Each of connection conductors 140 is provided inside outer conductor 120. Connection conductors 140 are connected to second ends of flexible conductors 130 in one-to-one correspondence. That is to say, one connection conductor 140 is connected to one flexible conductor 130 correspondingly. Each of connection conductors 140 is made of metal having high thermal conductivity, such as aluminum or copper. In the present embodiment, each of connection conductors 140 has a plate shape.

As shown in FIG. 4, in the present embodiment, each of flexible conductors 130 and a corresponding one of connection conductors 140 are connected with an insulating layer 170 therebetween. Insulating layer 170 has heat conductivity and electrical insulating properties. Insulating layer 170 may be, for example, silicone rubber containing alumina. Flexible conductors 130 and connection conductors 140 may be connected in any manner other than the manner described above. It suffices that flexible conductor 130 and connection conductor 140 are connected while maintaining high thermal conductivity therebetween by, for example, screwing, brazing, or welding.

Heat pipe 150 contains refrigerant 190. Used as refrigerant 190 may be fluorine refrigerant or fluorocarbon refrigerant having high insulating properties.

Heat pipe 150 is connected to each of connection conductors 140. As described above, the connection between flexible conductor 130 and connection conductor 140 allows flexible conductor 130 to absorb a displacement of inner conductor 110 during the interruption of the circuit, thereby reducing transmission of the displacement of inner conductor 110 from connection conductor 140 to heat pipe 150. The portion of heat pipe 150 which is connected to connection conductor 140 is a vaporizing portion at which refrigerant 190 is heated to vaporize.

Heat pipe 150 is drawn to outside of outer conductor 120. Radiator 160 is provided on the outer circumference of a portion 152 of heat pipe 150 which is drawn to outside of outer conductor 120. Radiator 160 is provided in the form of a plurality of fins. Radiator 160 is preferably disposed at a position at which heat exchange with the outside air is performed efficiently.

Portion 152 of heat pipe 150 which is drawn to outside of outer conductor 120 is a liquefying portion at which refrigerant 190 is cooled to liquefy. For this reason, portion 152 of heat pipe 150 which is drawn to outside of outer conductor 120 is preferably configured to allow liquefied refrigerant 190 to efficiently return to the vaporizing portion.

Heat pipe 150 includes an insulating hollow body 151 located inside outer conductor 120. Insulating hollow body 151 insulates the portion of heat pipe 150 which is located on the outer conductor 120 side and the portion of heat pipe 150 which is located on the inner conductor 110 side from each other. In the present embodiment, insulating hollow body 151 is made of insulating ceramic. Note that the material for insulating hollow body 151 is not limited to ceramic and may be any electrically insulating material. The outer circumferential surface of insulating hollow body 151 has a bellows shape for an increased creeping distance. The inner circumferential surface of insulating hollow body 151 has such a shape as to be continuous with the inner circumferential surface of heat pipe 150. The portion of heat pipe 150 other than insulating hollow body 151 is made of metal having high thermal conductivity, for example, copper.

As shown in FIG. 3, the portion of heat pipe 150 on the outer conductor 120 side and insulating hollow body 151 are each brazed to a pipe 159 made of stainless steel. This causes the portion of heat pipe 150 on the outer conductor 120 side and insulating hollow body 151 to be integrated with each other.

Similarly, the portion of heat pipe 150 on the inner conductor 110 side and insulating hollow body 151 are each brazed to pipe 159 made of stainless steel. This causes the portion of heat pipe 150 on the inner conductor 110 side and insulating hollow body 151 to be integrated with each other.

The portion of heat pipe 150 on the outer conductor 120 side is fixed to outer conductor 120. Heat pipe 150 has a plurality of sections each connecting a corresponding one of connection conductors 140 to insulating hollow body 151.

In the present embodiment, heat pipe 150 has two sections 153 each connecting a corresponding one of the two connection conductors 140 to insulating hollow body 151. That is to say, heat pipe 150 is one pipe on the outer conductor 120 side and is branched to be connected to each of the two connection conductors 140 on the inner conductor 110 side.

Each of the two sections 153 of heat pipe 150 includes an inclined portion and a portion extending vertically. This allows supply of liquefied refrigerant 190 to each of the two supply portions.

Inside each of the two sections 153 of heat pipe 150, opposite flows of an air current of refrigerant 190, which has vaporized in the vaporizing portion, and a liquid current of refrigerant 190, which has liquefied in the liquefying portion, are generated. Thus, 15 mm or more is provided to the diameter of heat pipe 150 at two sections 153.

Heat pipe 150 further includes a communication path 154 connecting the portions of heat pipe 150 to each other to be in communication with each other. Each of the row portions is connected to a corresponding one of the two connection conductors 140, That is to say, communication path 154 connects the vaporizing portions to each other. This allows the vaporizing portions to supply liquefied refrigerant 190 therebetween.

In circuit breaker 100 according to the present embodiment, the heat of inner conductor 110 which is generated during energization is conveyed to the vaporizing portion of heat pipe 150 through flexible conductor 130 and connection conductor 140. Liquefied refrigerant 190 heated by the heat conducted to the vaporizing portion of heat pipe 150 liquefies and flows upward in heat pipe 150 to reach the liquefying portion. Refrigerant 190 is subjected to heat exchange with the outside air in the liquefying portion, thereby being cooled to liquefy. Liquefied refrigerant 190 flows downward in heat pipe 150 to return to the vaporizing portion.

If there is an imbalance in the temperature of the heat generated by inner conductor 110 during energization, an amount by which refrigerant 190 vaporizes is greater in the vaporizing portion that cools inner conductor 110 on the higher temperature side than in the vaporizing portion that cools inner conductor 110 on the lower temperature side. Since circuit breaker 100 according to the present embodiment includes communication path 154, liquefied refrigerant 190 can be supplied from the vaporizing portion that cools inner conductor 110 on the lower temperature side to the vaporizing portion that cools inner conductor 110 on the higher temperature side.

Thus, a lack of liquefied refrigerant 190 can be reduced in the vaporizing portion that cools inner conductor 110 on the higher temperature side. This can reduce a further increase in the temperature difference at inner conductor 110. Consequently, inner conductor 110 can be cooled stably.

If liquefied refrigerant 190 flows disproportionately through one of the two sections 153 at the branch portion of heat pipe 150 on the inner conductor 110 side, liquefied refrigerant 190 can be supplied from the vaporizing portion, to which a greater amount of liquefied refrigerant 190 has been supplied, to the vaporizing portion, to which a smaller amount of liquefied refrigerant 190 has been supplied, through communication path 154.

Thus, a lack of liquefied refrigerant 190 can be reduced in the vaporizing portion to which a smaller amount of liquefied refrigerant 190 has been supplied from the branch portion of heat pipe 150 on the inner conductor 110 side. This can reduce an increase in the temperature difference in inner conductor 110. Consequently, inner conductor 110 can be cooled stably.

In the present embodiment, since each of flexible conductors 130 is connected to a corresponding one of connection conductors 140 with insulating layer 170 having heat conductivity and electrical insulating properties therebetween, the insulating performance required for insulating hollow body 151 can be reduced.

Although heat pipe 150 has two sections 153 in circuit breaker 100 according to the present embodiment, the number of sections 153 provided is not limited to two and may be three or more. When heat pipe 150 has three or more sections 153, it suffices that at least two sections 153 are in communication with each other by communication path 154.

Embodiment 2

A circuit breaker according to Embodiment 2 of the present invention will now be described with reference to the drawing. The circuit breaker according to Embodiment 2 of the present invention differs from circuit breaker 100 according to Embodiment 1 only in the shape of the communication path, and accordingly, description of the configuration similar to that of circuit breaker 100 according to Embodiment 1 will not be repeated.

Figure 5:
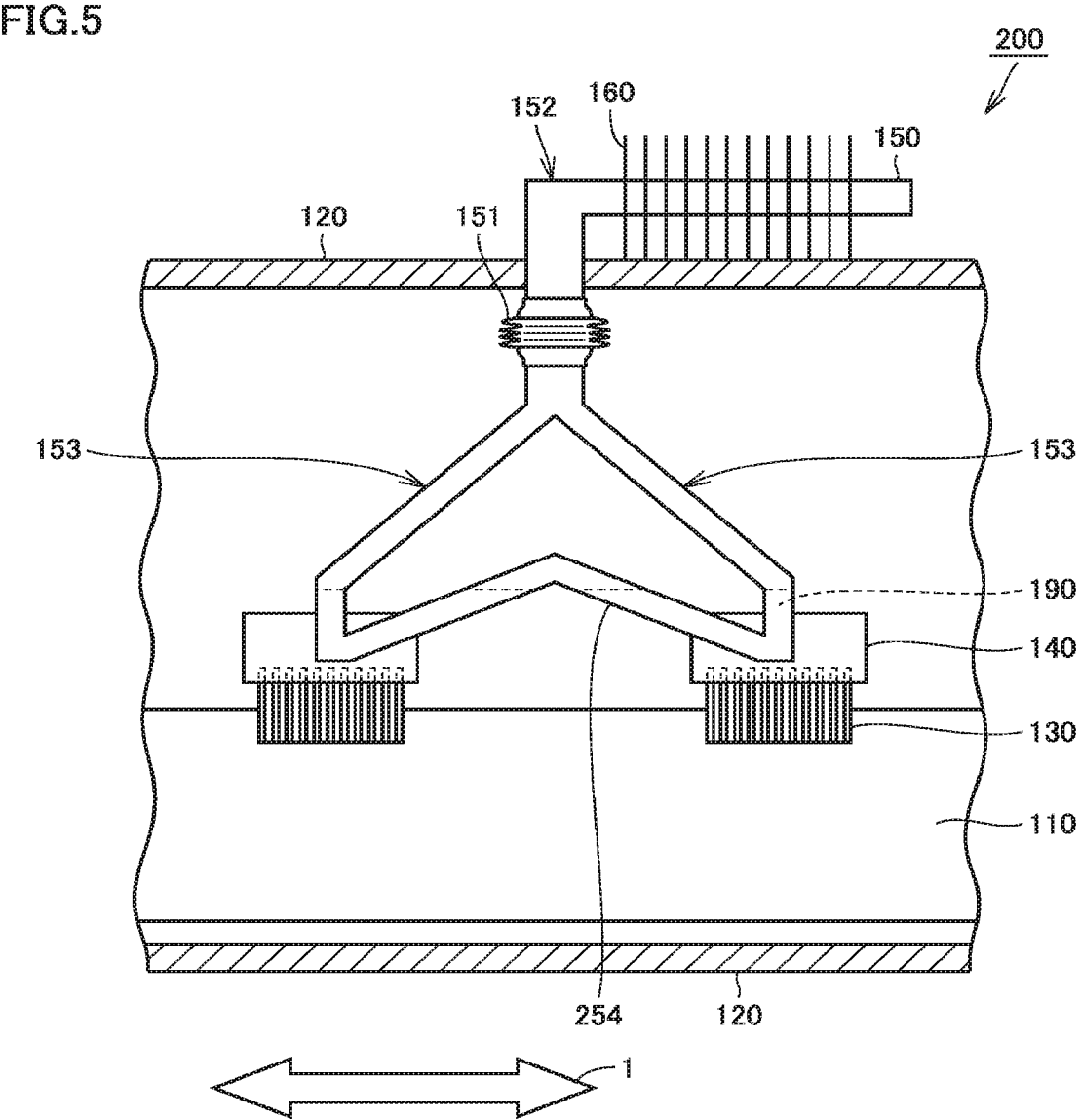
FIG. 5 is a vertical sectional view showing a configuration of a circuit breaker according to Embodiment 2 of the present invention.

FIG. 5 is a vertical sectional view showing a configuration of the circuit breaker according to Embodiment 2 of the present invention. As shown in FIG. 5, a heat pipe 150 of a circuit breaker 200 according to Embodiment 2 of the present invention has a communication path 254. Communication path 254 includes a portion inclined to be in contact with each of two sections 153 while extending downward to each of two sections 153.

Specifically, communication path 254 is formed of a portion, which extends obliquely upward from a portion of heat pipe 150 connected to one of connection conductors 140, and a portion, which extends obliquely upward from a portion of heat pipe 150 connected to the other connection conductor 140.

The inclined portion of communication path 254 is provided at such an angle as to allow supply of liquefied refrigerant 190 between the vaporizing portions. This angle is appropriately determined depending on factors such as an amount of refrigerant 190 filling heat pipe 150, an expected heat generation amount of inner conductor 110, and a heat exchange efficiency in the liquefying portion.

Since communication path 254 includes the inclined portion described above, liquefied refrigerant 190 in communication path 254 can be collected to each vaporizing portion. This can reduce a lack of liquefied refrigerant 190 in the vaporizing portion.

Embodiment 3

A circuit breaker according to Embodiment 3 of the present invention will now be described with reference to the drawing. The circuit breaker according to Embodiment 3 of the present invention differs from circuit breaker 100 according to Embodiment 1 mainly in that it further includes a return path, and accordingly, description of the configuration similar to that of circuit breaker 100 according to Embodiment 1 will not be repeated.

Figure 6:
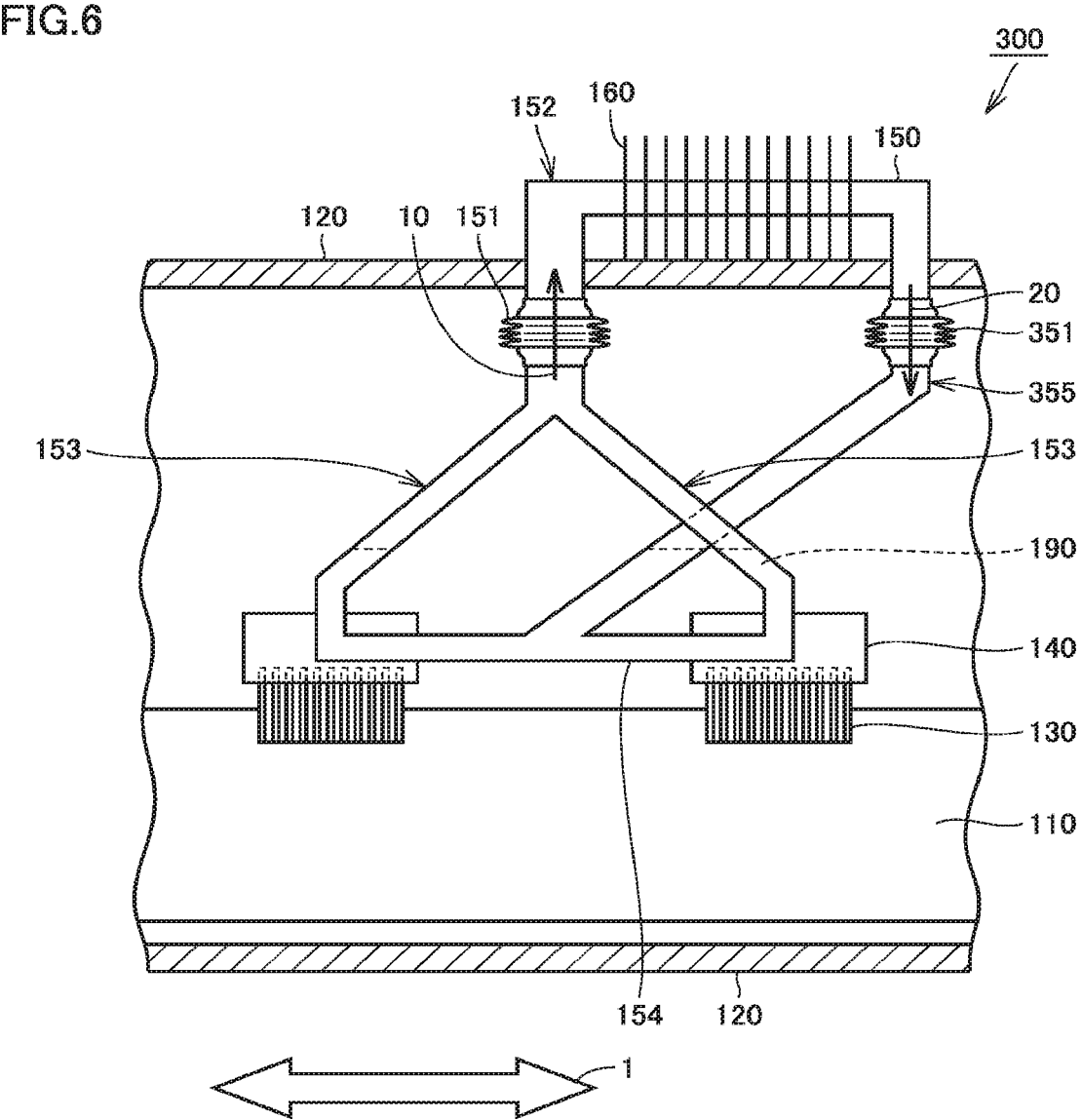
FIG. 6 is a vertical sectional view showing a configuration of a circuit breaker according to Embodiment 3 of the present invention.

FIG. 6 is a vertical sectional view showing a configuration of the circuit breaker according to Embodiment 3 of the present invention. As shown in FIG. 6, a heat pipe 150 of a circuit breaker 300 according to Embodiment 3 of the present invention further includes a return path 355 connecting portion 152 drawn to outside of outer conductor 120 and communication path 154 to each other. Return path 355 is connected to a midpoint of communication path 154.

Heat pipe 150 of circuit breaker 300 according to Embodiment 3 of the present invention further includes an insulating hollow body 351 located inside outer conductor 120. Insulating hollow body 351 has a configuration similar to that of insulating hollow body 151.

Insulating hollow body 151 is disposed at a position on the first end side of portion 152 of heat pipe 150 which is drawn to outside of outer conductor 120, and insulating hollow body 351 is disposed at a position on the second end side of portion 152 of heat pipe 150 which is drawn to outside of outer conductor 120. Insulating hollow bodies 151 and 351 insulate the portion of heat pipe 150 on the outer conductor 120 side and the portion of heat pipe 150 on the inner conductor 110 side from each other.

In circuit breaker 300 according to Embodiment 3 of the present invention, liquefied refrigerant 190 heated by the heat conveyed to the vaporizing portion of heat pipe 150 vaporizes and flows upward in heat pipe 150 as indicated by an arrow 10, thereby reaching the liquefying portion through insulating hollow body 151. Refrigerant 190 performs heat exchange with the outside air in the liquefying portion, thereby being cooled to liquefy.

Inside portion 152 of heat pipe 150 which is drawn to outside of outer conductor 120, an air current is generated from the first end side to the second end side. Liquefied refrigerant 190 thus flows toward the second end side of portion 152 of heat pipe 150 which is drawn to outside of outer conductor 120, and flows downward in heat pipe 150 through insulating hollow body 351 as indicated by an arrow 20, thereby flowing into communication path 154. Liquefied refrigerant 190 that has flowed into communication path 154 is supplied to each vaporizing portion.

As described above, in circuit breaker 300 according to Embodiment 3 of the present invention, a loop through which refrigerant 190 circulates is formed. This can provide a smooth flow of refrigerant 190, thereby cooling inner conductor 110 stably. Further, a flow path for the air current of refrigerant 190 which has vaporized and a flow path for the liquid current of refrigerant 190 which has liquefied can be separated from each other, thus reducing the diameter of heat pipe 150 in at least part of section 153 and return path 355.

Embodiment 4

A circuit breaker according to Embodiment 4 of the present invention will now be described with reference to the drawing. The circuit breaker according to Embodiment 4 of the present invention differs from circuit breaker 100 according to Embodiment 1 mainly in that the heat pipe has a loop shape, and accordingly, description of the configuration similar to that of circuit breaker 100 according to Embodiment 1 will not be repeated.

Figure 7:
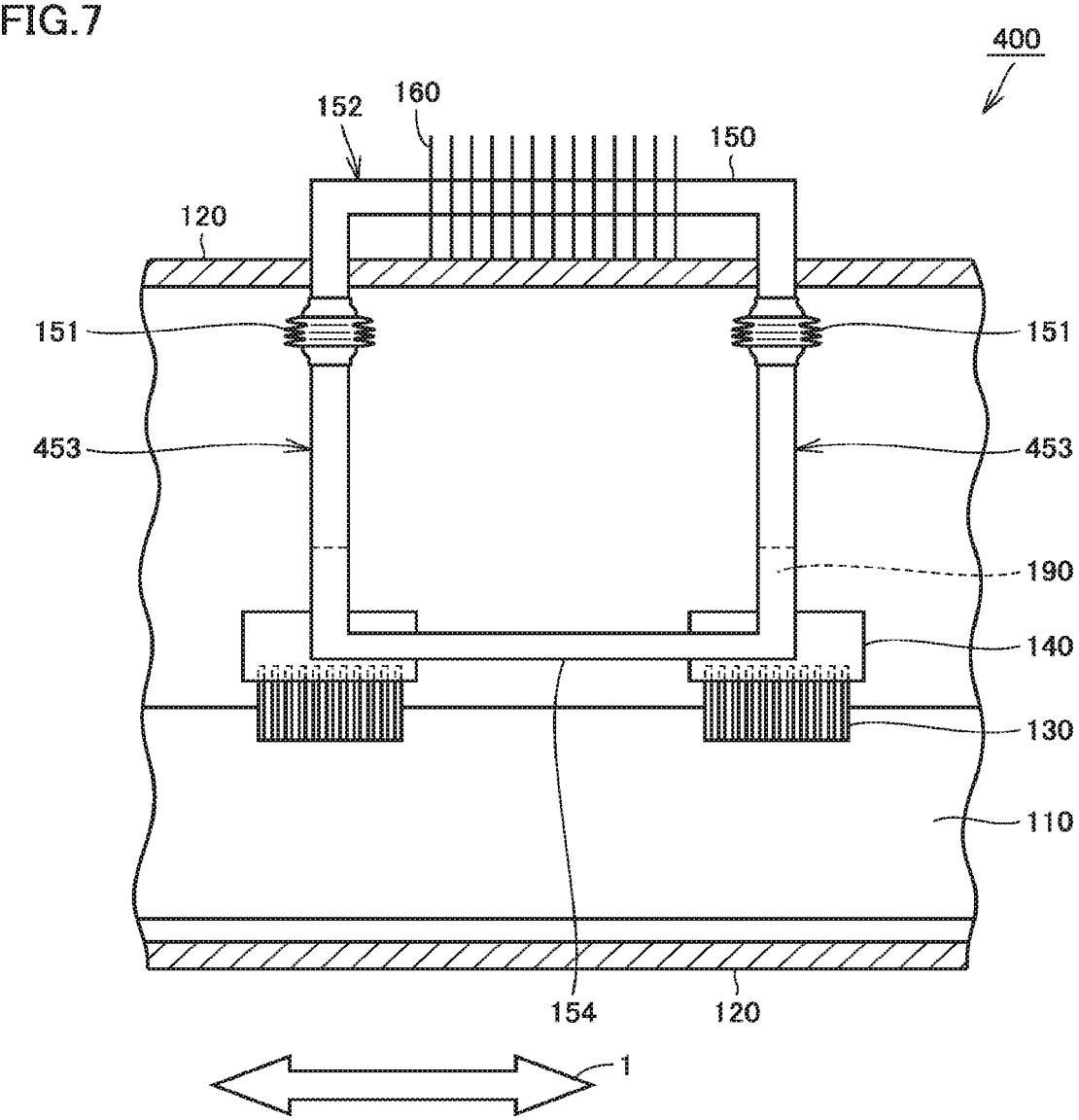
FIG. 7 is a vertical sectional view showing a configuration of a circuit breaker according to Embodiment 4 of the present invention.

FIG. 7 is a vertical sectional view showing a configuration of the circuit breaker according to Embodiment 4 of the present invention. As shown in FIG. 7, a heat pipe 150 of a circuit breaker 400 according to Embodiment 4 of the present invention further includes another insulating hollow body 151 located inside outer conductor 120.

One insulating hollow body 151 is disposed at a position on the first end side of portion 152 of heat pipe 150 which is drawn to outside of outer conductor 120, and the other insulating hollow body 151 is disposed at a position on the second end side of portion 152 of heat pipe 150 which is drawn to outside of outer conductor 120.

In the present embodiment, heat pipe 150 has two sections 453 each connecting a corresponding one of two connection conductors 140 and a corresponding one of the two insulating hollow bodies 151. Each of the two sections 453 of heat pipe 150 extends vertically. This allows supply of liquefied refrigerant 190 to each of the two supply portions.

Inside each of the two sections 453 of heat pipe 150, opposite flows of an air current of refrigerant 190, which has vaporized in the vaporizing portion, and a liquid current of refrigerant 190, which has liquefied in the liquefying portion, are generated. Thus, 15 mm or more is provided to the diameter of heat pipe 150 at two sections 453.

Heat pipe 150 further includes a communication path 154 connecting portions of heat pipe 150 to each other to cause the two sections 453 to be in communication with each other. Each of the portions is connected to a corresponding one of the two connection conductors 140, That is to say, communication path 154 connects the vaporizing portions to each other. This allows the vaporizing portions to supply liquefied refrigerant 190 therebetween. Consequently, inner conductor 110 can be cooled stably.

Embodiment 5

A circuit breaker according to Embodiment 5 of the present invention will now be described with reference to the drawing. The circuit breaker according to Embodiment 5 of the present invention differs from circuit breaker 400 according to Embodiment 4 mainly in that it further includes a return path, and accordingly, description of the configuration similar to that of circuit breaker 400 according to Embodiment 4 will not be repeated.

Figure 8:
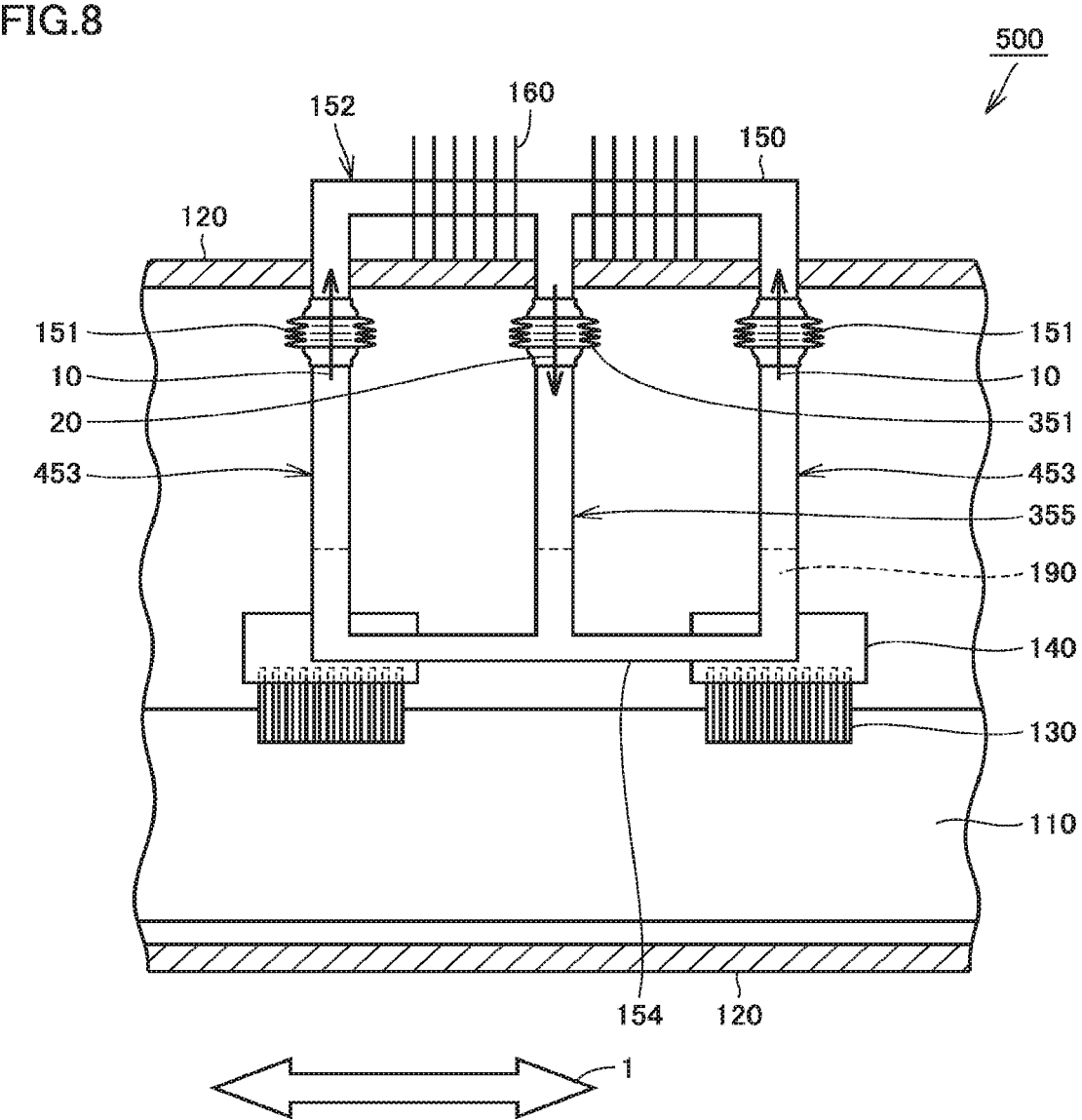
FIG. 8 is a vertical sectional view showing a configuration of a circuit breaker according to Embodiment 5 of the present invention.

FIG. 8 is a vertical sectional view showing a configuration of the circuit breaker according to Embodiment 5 of the present invention. As shown in FIG. 8, a heat pipe 150 of a circuit breaker 500 according to Embodiment 5 of the present invention further includes a return path 355 connecting portion 152 which is drawn to outside of outer conductor 120 and communication path 154 to each other. Return path 355 is connected to a midpoint of communication path 154.

Heat pipe 150 of circuit breaker 500 according to Embodiment 5 of the present invention further includes an insulating hollow body 351 located inside outer conductor 120. Insulating hollow body 351 has a configuration similar to that of insulating hollow body 151.

One insulating hollow body 151 is disposed at a position on the first end side of portion 152 of heat pipe 150 which is drawn to outside of outer conductor 120, and the other insulating hollow body 151 is disposed at a position on the second end side of portion 152 of heat pipe 150 which is drawn to outside of outer conductor 120. Insulating hollow body 351 is disposed at a position closer to the center of portion 152 of heat pipe 150 which is drawn to outside of outer conductor 120. Insulating hollow bodies 151 and 351 insulate the portion of heat pipe 150 on the outer conductor 120 side and the portion of heat pipe 150 on the inner conductor 110 side from each other.

In circuit breaker 500 according to Embodiment 5 of the present invention, liquefied refrigerant 190 heated by the heat conducted to the vaporizing portion of heat pipe 150 vaporizes and flows upward in heat pipe 150 as indicated by an arrow 10, thereby reaching the liquefying portion through insulating hollow body 151. Refrigerant 190 is subjected to heat exchange with the outside air in the liquefying portion, thereby being cooled to liquefy.

Inside portion 152 of heat pipe 150 which is drawn to outside of outer conductor 120, air currents are generated from the opposite ends toward the central portion. Thus, liquefied refrigerant 190 flows toward the central portion of portion 152 of heat pipe 150 which is drawn to outside of outer conductor 120, and flows downward in heat pipe 150 through insulating hollow body 351 as indicated by an arrow 20, thereby flowing into communication path 154. Liquefied refrigerant 190 which has flowed into communication path 154 is supplied to each vaporizing portion.

As described above, in circuit breaker 500 according to Embodiment 5 of the present invention, a loop through which refrigerant 190 circulates is formed. This provides a smooth flow of refrigerant 190, thus cooling inner conductor 110 stably. Further, the flow path for the air current of refrigerant 190 which has vaporized and the flow path for the liquid current of refrigerant 190 which has liquefied can be separated from each other, thus reducing the diameter of heat pipe 150 in at least part of section 453 and return path 355.

Embodiment 6

A circuit breaker according to Embodiment 6 of the present invention will now be described with reference to the drawing. The circuit breaker according to Embodiment 6 of the present invention differs from circuit breaker 100 according to Embodiment 1 mainly in that the portion of the heat pipe on the inner conductor side is branched into portions in a manner of sandwiching the inner conductor therebetween, and accordingly, description of the configuration similar to that of Embodiment 1 will not be repeated.

Figure 9:
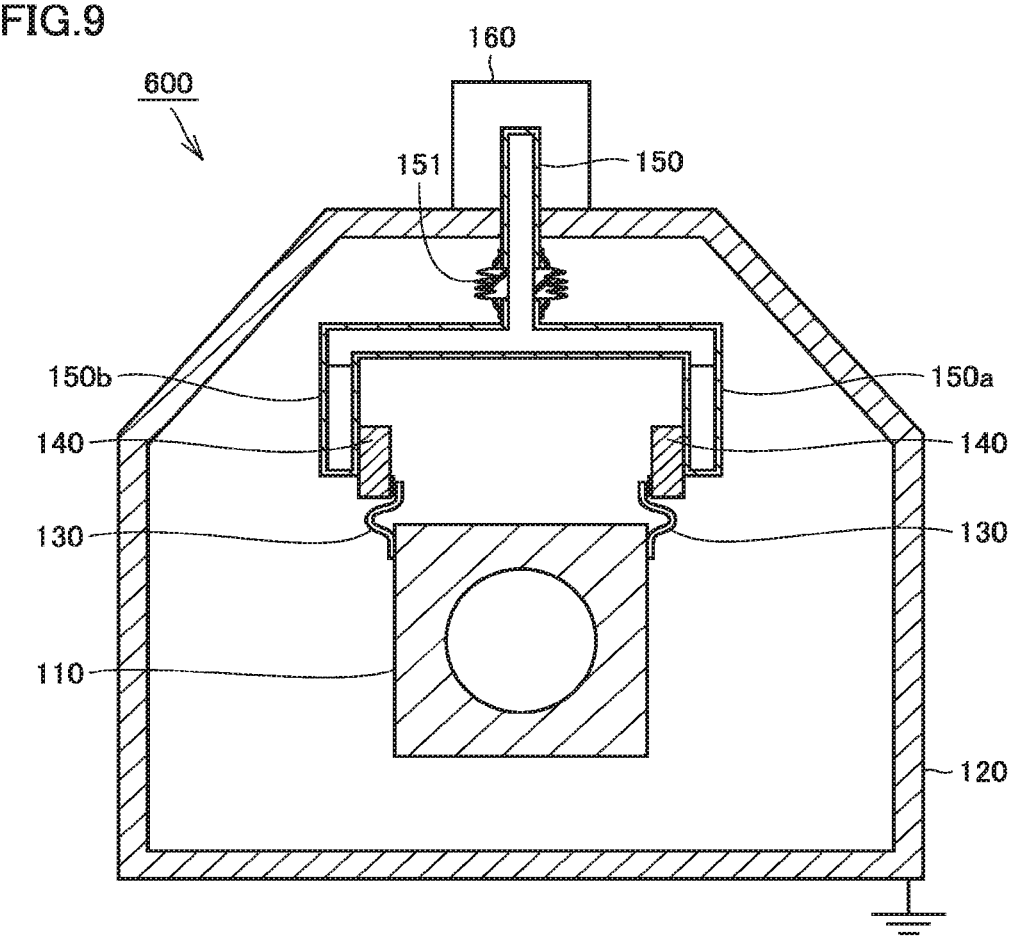
FIG. 9 is a lateral sectional view showing a configuration of a circuit breaker according to Embodiment 6 of the present invention.

FIG. 9 is a lateral sectional view showing a configuration of the circuit breaker according to Embodiment 6 of the present invention. As shown in FIG. 9, a heat pipe 150 of a circuit breaker 600 according to Embodiment 6 of the present invention is branched, at the portion of heat pipe 150 which is located on the inner conductor 110 side, into a first branch path 150a and a second branch path 150b in a manner of sandwiching inner conductor 110 therebetween. Each of first branch path 150a and second branch path 150b is connected to inner conductor 110 through connection conductor 140 and flexible conductor 130.

Each of first branch path 150a and second branch path 150b includes two sections 153 and communication path 154, similarly to the portion of heat pipe 150 on the inner conductor 110 side according to Embodiment 1. Each of first branch path 150a and second branch path 150b may include two sections 153 and communication path 254, similarly to the portion of heat pipe 150 on the inner conductor 110 side according to Embodiment 2.

When the diameter of inner conductor 110 is large, that is, greater than or equal to 500 mm, cooling only the first end side of inner conductor 110 in its radial direction by the vaporizing portion of heat pipe 150 may lead to a large imbalance in the temperature distribution of inner conductor 110 in its circumferential direction.

In circuit breaker 600 according to Embodiment 6 of the present invention, thus, the opposite sides of inner conductor 110 in its radial direction are cooled by the vaporizing portion of heat pipe 150. This can lead to a more uniform temperature distribution of inner conductor 110 in its circumferential direction.

Embodiment 7

A circuit breaker according to Embodiment 7 of the present invention will now be descried with reference to the drawing. The circuit breaker according to Embodiment 7 of the present invention differs from circuit breaker 600 according to Embodiment 6 mainly in that the portion of the heat pipe on the inner conductor side is formed into a loop, and accordingly, description of the configuration similar to that of circuit breaker 600 according to Embodiment 6 will not be repeated.

Figure 10:
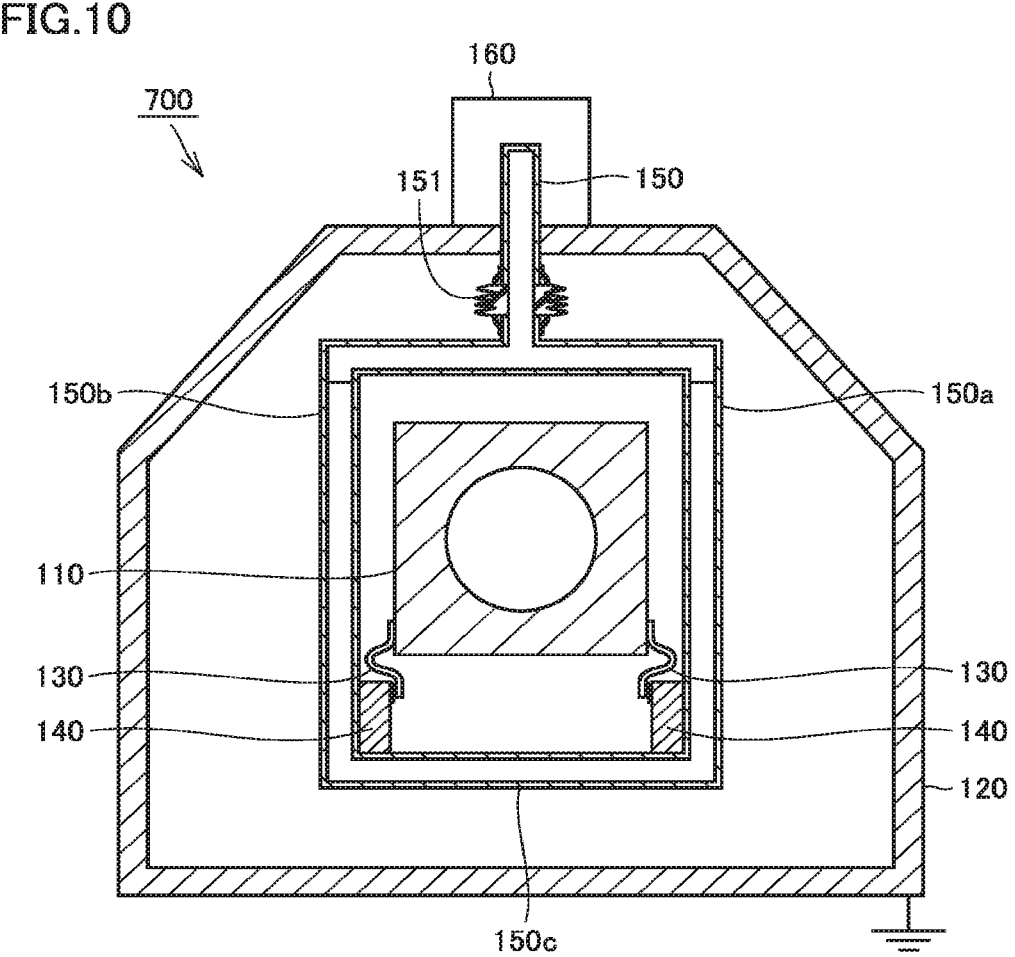
FIG. 10 is a lateral sectional view showing a configuration of a circuit breaker according to Embodiment 7 of the present invention.

FIG. 10 is a lateral sectional view showing a configuration of the circuit breaker according to Embodiment 7 of the present invention. As shown in FIG. 10, in a heat pipe 150 of a circuit breaker 700 according to Embodiment 7 of the present invention, a first branch path 150a and a second branch path 150b are connected to each other by a communication path 150c so as to surround inner conductor 110. Consequently, the portion of heat pipe 150 on the inner conductor 110 side is formed into a loop.

If the temperature of the heat generated by inner conductor 110 during energization has an imbalance in inner conductor 110 in its radial direction, a greater amount of refrigerant 190 vaporizes in the vaporizing portion of the branch portion which cools inner conductor 110 on the higher temperature side than in the vaporizing portion of the branch path which cools inner conductor 110 on the lower temperature side. Since circuit breaker 700 according to the present embodiment includes communication path 150c, liquefied refrigerant 190 can be supplied from the vaporizing portion of the branch path which cools inner conductor 110 on the lower temperature side to the vaporizing portion of the branch path which cools inner conductor 110 on the higher temperature side.

Thus, a lack of liquefied refrigerant 190 can be reduced in the vaporizing portion of the branch path which cools inner conductor 110 on the higher temperature side. This can reduce a further increase in the temperature difference of inner conductor 110 in inner conductor 110 in its radial direction. Consequently, inner conductor 110 can be cooled stably.

It should be understood that the embodiments disclosed herein have been presented for the purpose of illustration and non-restrictive in every respect. It is intended that the scope of the present invention is not limited to the description above but defined by the scope of the claims and encompasses all modifications equivalent in meaning and scope to the claims.

REFERENCE SIGNS LIST 100, 200, 300, 400, 500, 600, 700 circuit breaker, 110 inner conductor, 120 outer conductor, 130 flexible conductor, 140 connection conductor, 150 heat pipe, 150a first branch path, 150b second branch path, 150c, 151, 351 insulating hollow body, 152 portion of heat pipe which is drawn to outside of outer conductor, 153, 453 section of heat pipe, 154, 254 communication path, 159 pipe, 160 radiator, 170 insulating layer, 190 refrigerant, 355 return path.

The invention claimed is:
1. A circuit breaker comprising:
an inner conductor having a direction of extension;
an outer conductor surrounding an outer circumference of the inner conductor with a spacing between the inner conductor and the outer conductor;
a plurality of flexible conductors each having a first end connected to the outer circumference of the inner conductor and having flexibility, the first ends of the plurality of flexible conductors being spaced from each other in the direction of extension;
a plurality of connection conductors provided inside the outer conductor and connected to second ends of the plurality of flexible conductors in one-to-one correspondence;
a heat pipe connected to each of the plurality of connection conductors and drawn to outside of the outer conductor, the heat pipe containing refrigerant; and a radiator provided on an outer circumference of a first portion of the heat pipe which is drawn to outside of the outer conductor, wherein the heat pipe includes an insulating hollow body located inside the outer conductor. and a second portion of the heat pipe on an outer conductor side and a third portion of the heat pipe on an inner conductor side are insulated from each other by the insulating hollow body, and the heat pipe has a plurality of sections each connecting a corresponding one of the plurality of connection conductors to the insulating hollow body, and the heat pipe further includes a communication path connecting fourth and fifth portions of the heat pipe to each other to cause the plurality of sections to be in communication with each other, each of the fourth and fifth portions being connected to a corresponding one of the plurality of connection conductors.

2. The circuit breaker according to claim 1, wherein the communication path includes an inclined portion that is inclined to be in contact with each of the plurality of sections while extending toward each of the plurality of sections.

3. The circuit breaker according to claim 2, wherein the heat pipe is provided as one pipe on the outer conductor side and is branched to be connected to each of the plurality of connection conductors on the inner conductor side.

4. The circuit breaker according to claim 3, wherein the heat pipe further includes a return path connecting the second portion which is drawn to outside of the outer conductor and the communication path to each other.

5. The circuit breaker according to claim 4, wherein each of the plurality of flexible conductors and a corresponding one of the plurality of connection conductors are connected to each other with an insulating layer therebetween, the insulating layer having heat conductivity and electrical insulating properties.

6. The circuit breaker according to claim 2, wherein the heat pipe further includes a return path connecting the second portion which is drawn to outside of the outer conductor and the communication path to each other.

7. The circuit breaker according to claim 6, wherein each of the plurality of flexible conductors and a corresponding one of the plurality of connection conductors are connected to each other with an insulating layer therebetween, the insulating layer having heat conductivity and electrical insulating properties.

8. The circuit breaker according to claim 2, wherein each of the plurality of flexible conductors and a corresponding one of the plurality of connection conductors are connected to each other with an insulating layer therebetween, the insulating layer having heat conductivity and electrical insulating properties.

9. The circuit breaker according to claim 3, wherein each of the plurality of flexible conductors and a corresponding one of the plurality of connection conductors are connected to each other with an insulating layer therebetween, the insulating layer having heat conductivity and electrical insulating properties.

10. The circuit breaker according to claim 1, wherein the heat pipe is provided as one pipe on the outer conductor side and is branched to be connected to each of the plurality of connection conductors on the inner conductor side.

11. The circuit breaker according to claim 10, wherein the heat pipe further includes a return path connecting the second portion which is drawn to outside of the outer conductor and the communication path to each other.

12. The circuit breaker according to claim 11, wherein each of the plurality of flexible conductors and a corresponding one of the plurality of connection conductors are connected to each other with an insulating layer therebetween, the insulating layer having heat conductivity and electrical insulating properties.

13. The circuit breaker according to claim 10, wherein each of the plurality of flexible conductors and a corresponding one of the plurality of connection conductors are connected to each other with an insulating layer therebetween, the insulating layer having heat conductivity and electrical insulating properties.

14. The circuit breaker according to claim 1, wherein the heat pipe further includes a return path connecting the second portion which is drawn to outside of the outer conductor and the communication path to each other.

15. The circuit breaker according to claim 14, wherein each of the plurality of flexible conductors and a corresponding one of the plurality of connection conductors are connected to each other with an insulating layer therebetween, the insulating layer having heat conductivity and electrical insulating properties.

16. The circuit breaker according to claim 1, wherein each of the plurality of flexible conductors and a corresponding one of the plurality of connection conductors are connected to each other with an insulating layer therebetween, the insulating layer having heat conductivity and electrical insulating properties.

* * * * *